United States Patent
Huang (10) Patent No.: US 9,333,681 B2
(45) Date of Patent: May 10, 2016

(54) OPTICAL LENS, METHOD FOR MANUFACTURING THE OPTICAL LENS AND LIGHT SOURCE MODULE INCORPORATING THE OPTICAL LENS

(71) Applicant: HON HAI PRECISION INDUSTRY CO., LTD., New Taipei (TW)

(72) Inventor: Yung-Lun Huang, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 44 days.

(21) Appl. No.: 14/469,847

(22) Filed: Aug. 27, 2014

(65) Prior Publication Data
US 2015/0062905 A1  Mar. 5, 2015

(30) Foreign Application Priority Data

Aug. 27, 2013 (TW) .............................. 102130512 A (51) Int. Cl.
| | |
|---|---|
| *F21V 3/00* | (2015.01) |
| *B29C 39/22* | (2006.01) |
| *B29C 39/00* | (2006.01) |
| *B29C 39/02* | (2006.01) |
| *B29C 39/10* | (2006.01) |
| *B29C 39/12* | (2006.01) |
| *B29D 11/00* | (2006.01) |
| *B29C 39/08* | (2006.01) |
| *F21V 5/04* | (2006.01) |
| *F21Y 101/02* | (2006.01) |
| *B29L 31/34* | (2006.01) |
| *B29L 11/00* | (2006.01) |

(52) U.S. Cl.
CPC ............... *B29C 39/22* (2013.01); *B29C 39/003* (2013.01); *B29C 39/02* (2013.01); *B29C 39/026* (2013.01); *B29C 39/08* (2013.01); *B29C 39/10* (2013.01); *B29C 39/123* (2013.01); *B29D 11/00798* (2013.01); *B29K 2995/0018* (2013.01); *B29K 2995/0026* (2013.01); *B29L 2011/0016* (2013.01); *B29L 2031/34* (2013.01); *F21V 5/04* (2013.01); *F21Y 2101/02* (2013.01)

(58) Field of Classification Search
CPC .. B29C 41/00; B29C 59/00; B29D 11/00798; B29D 11/00855; B29L 2011/0016
USPC ......................... 362/368, 311.02, 311.03, 326
See application file for complete search history.

(56) References Cited

U.S. PATENT DOCUMENTS

| | | | |
|---|---|---|---|
| 2014/0321128 A1* | 10/2014 | Wu ........................ | F21S 48/215 362/308 |
| 2015/0043217 A1* | 2/2015 | Hu ........................... | F21K 9/50 362/308 |

\* cited by examiner

*Primary Examiner* — Ali Alavi
(74) *Attorney, Agent, or Firm* — Novak Druce Connolly Bove + Quigg LLP (57) ABSTRACT

A method for manufacturing an optical lens includes providing an uncured light diffusion body, the light diffusion body comprising a first optical surface located at a bottom thereof, and a second optical surface located at a top thereof and arranged oppositely to the first optical surface, the light diffusion body defining a receiving cavity recessed from a central portion of the second optical surface toward the first optical surface; introducing a light transmissive material doped with diffusion particles into the receiving cavity to a desired thickness; and solidifying the light transmissive material and the light diffusion body. An optical lens manufactured by the method and a light source module incorporating the optical lens are also provided.

20 Claims, 8 Drawing Sheets

OPTICAL LENS, METHOD FOR MANUFACTURING THE OPTICAL LENS AND LIGHT SOURCE MODULE INCORPORATING THE OPTICAL LENS

FIELD

The present disclosure relates generally to an optical lens, a method for manufacturing the optical lens, and a light source module incorporating the optical lens.

BACKGROUND

LEDs are solid state light emitting devices formed from semiconductors, which are more stable and reliable than other conventional light sources such as incandescent bulbs. Thus, LEDs are widely used in various fields such as numeral/character display elements, signal lights, light sources for lighting and display devices. An optical lens is usually employed to change the light distribution of the LEDs.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

The present disclosure is described in relation to a method for manufacturing an optical lens, the optical lens made by the method, and a light source module incorporating the optical lens.

Figure 3:
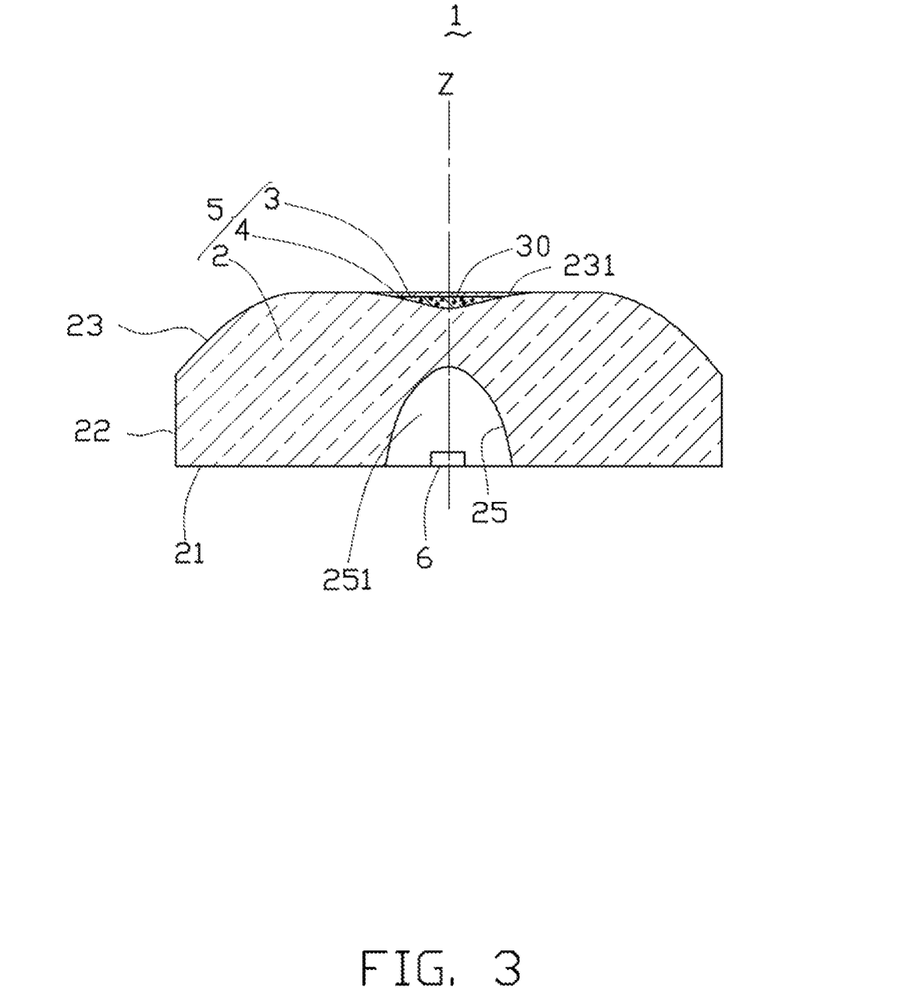
FIG. 3 is a cross-sectional view of the light source module of FIG. 1, taken along line III-III thereof.

Referring to FIG. 3, a light source module 1 in accordance with a first embodiment of the present disclosure is illustrated. The light source module 1 includes a light emitting diode (LED) light source 6 and an optical lens 5 optically coupled to the LED light source 6. The optical lens 5 includes a light diffusion body 2, a light transmissive layer 3, and an encapsulant layer 4 formed on a top of the light diffusion body 2 in sequence. The optical lens 5 is configured to diffuse light emitted from the LED light source 6.

Figure 1:
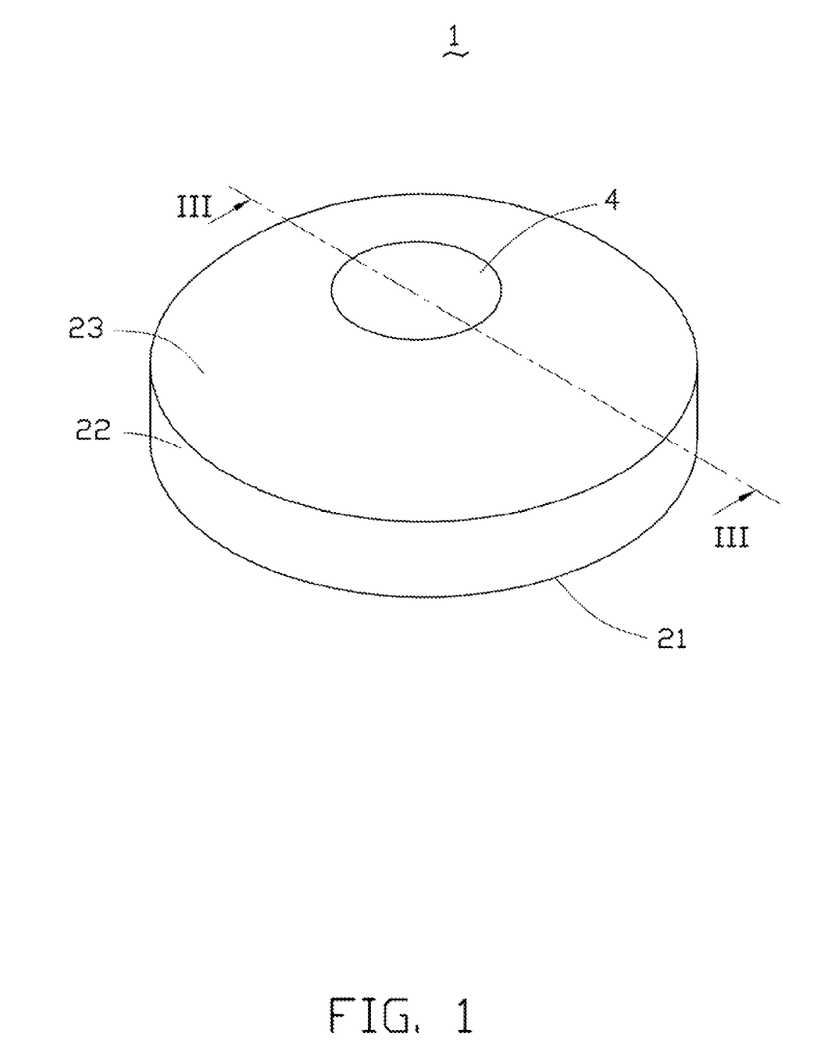
FIG. 1 is an isometric, prospective view of a light source module in accordance with a first embodiment of the present disclosure.
Figure 2:
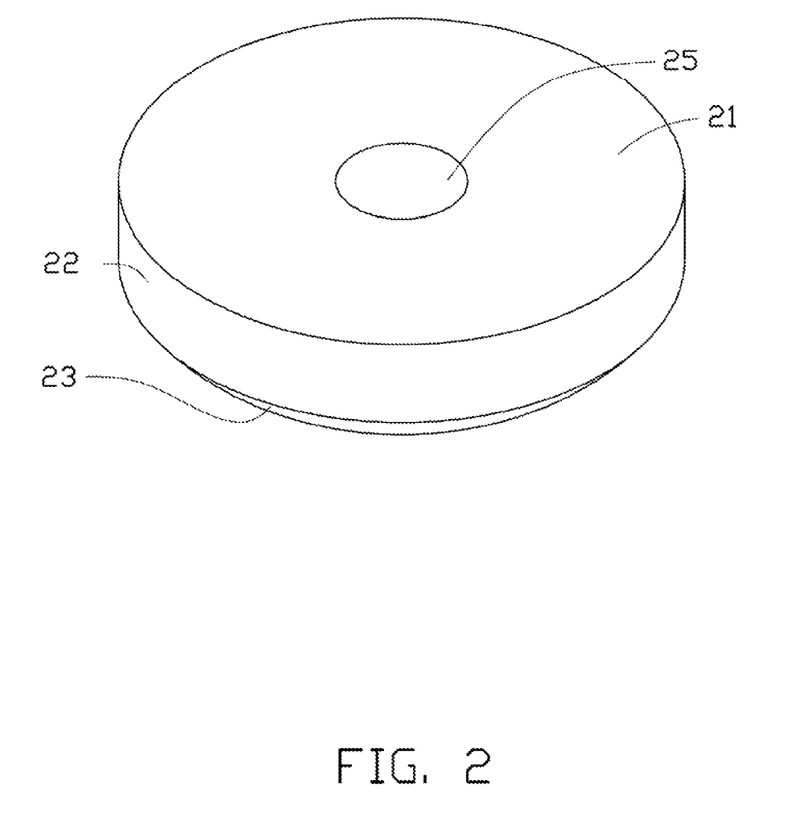
FIG. 2 is similar to FIG. 1, but viewed from an inverted aspect and only shows an optical lens of the light source module of FIG. 1.

Referring to FIGS. 1-3 together, the light diffusion body 2 includes a first optical surface 25 located at a bottom thereof, a second optical surface 23 located at a top thereof and arranged oppositely to the first optical surface 25, a third optical surface 22 extending between the first optical surface 25 and the second optical surface 23, and an annular bottom surface 21 interconnecting the a bottom side of the first optical surface 25 and a bottom side of the third optical surface 22. The third optical surface 22 is cylindrical and perpendicular to the bottom surface 21.

The light diffusion body 2 defines a receiving cavity 231 recessed from a central portion of the second optical surface 23 toward the first optical surface 25. The light transmissive layer 3 and the encapsulant layer 4 are formed in the receiving cavity 231 in sequence. In the present embodiment, the receiving cavity 231 has a funnel shaped configuration with an inner diameter thereof gradually decreasing toward the first optical surface 25.

The first optical surface 25 is recessed inwardly toward the second optical surface 23 to define a recess 251 for accommodating the LED light source 6. In the present embodiment, the light diffusion body 2 is symmetric with respect to an optical axis Z at a center thereof. The optical axis Z extends through the first optical surface 25 and the second optical surface 23. The first optical surface 25 is a part of an ellipsoid, and a major axis thereof is coincident with the optical axis Z of the light diffusion body 2. Alternatively, the first optical surface 25 can be a part of paraboloid of revolution or a part of sphere, according to specific requirements.

The light transmissive layer 3 is doped with diffusion particles 30. Light that is emitted from the LED light source 6 and enters into the light transmissive layer 3 is scattered by the diffusion particles 30. The light transmissive layer 3 is filled into the receiving cavity 231 to have a first thickness smaller than a depth of the receiving cavity 231. The encapsulant layer 4 covers the light transmissive layer 3. The light transmissive layer 3 is isolated from external air by the encapsulant layer 4. In a specific embodiment, a thickness of the encapsulant layer 4 is less than one half of the first thickness of the light transmissive layer 3. In the present embodiment, a refractive index of the light transmissive layer 3 is smaller than that of the light diffusion body 2, and a refractive index of the encapsulant layer 4 is smaller than that of the light transmissive layer 3.

The light diffusion body 2 is made of polycarbonate or methyl methacrylate styrene copolymer having a refractive index in a range between 1.57 and 1.59. The light transmissive layer 3 is made of polymethyl acrylate resin having a refractive index in a range between 1.41 and 1.49. The encapsulant layer 4 is made of silicone, glass, or the like.

The diffusion particles 30 can be made of a material selected from, but not limited to, a group consisting of sulfides, silicates, nitrides, nitrogen oxides, hydroxid, garnets and mixtures thereof, the diffusion particle 30 being capable of converting a wavelength of light emitted from the LED light source 6.

Figure 4:
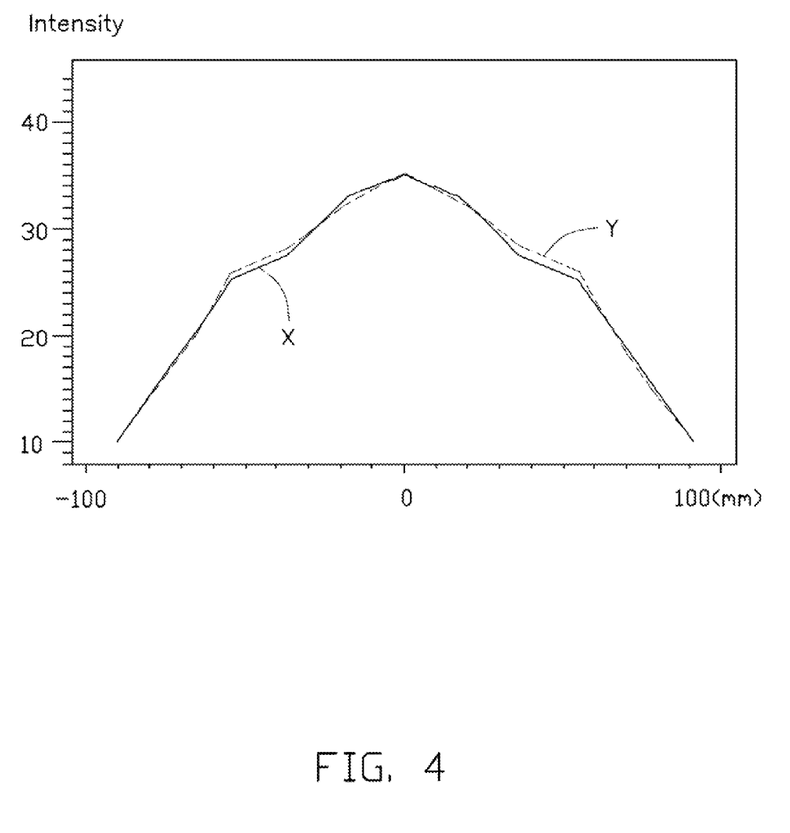
FIG. 4 is a light intensity distribution pattern of a traditional light source module, wherein the traditional light source module includes an LED light source and a light diffusion body covering the LED light source.

Referring to FIG. 4, a light intensity distribution of a traditional light source module (not shown) compared to the light source module 1 of FIG. 1 is illustrated, wherein the traditional light source module includes an LED light source and a light diffusion body covering the LED light source. Light emitted from the LED light source enters into the light diffusion body, and most of the entering light concentrated near the optical axis of the LED light source is directly refracted out of the light diffusion body, thereby generating a sharp peak having the highest light intensity in the light distribution pattern.

Figure 5:
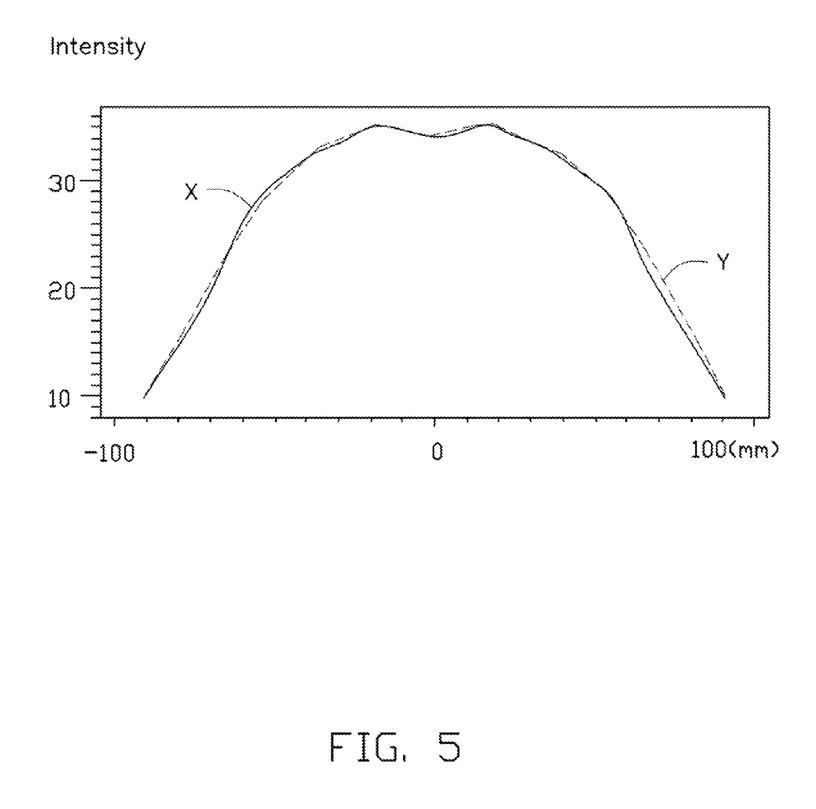
FIG. 5 is a light intensity distribution pattern of the light source module of FIG. 1.

Referring to FIG. 5, a light intensity distribution of the light source module 1 of FIG. 1 is illustrated. Light emitted from the LED light source 6 is refracted into the light diffusion body 2 through the first optical surface 25 thereof, and most of the entering light concentrated near the optical axis of the LED light source 6 passes through the light diffusion body 2, enters into the light transmissive layer 3, and is consequently scattered by the diffusion particles 30 doped in the light transmissive layer 3 in all directions, thereby eliminating the sharp peak existing in the light distribution pattern. Thus, the light source module 1 having a uniform light intensity distribution is obtained.

Figure 6:
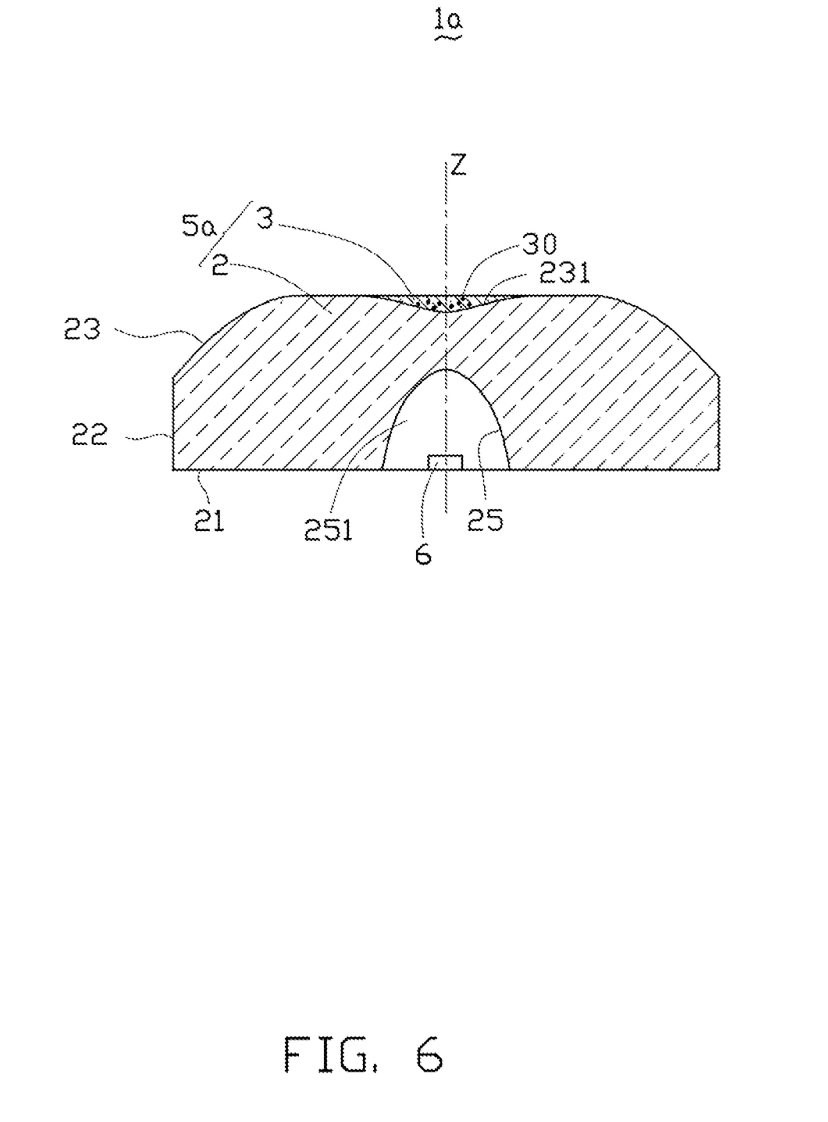
FIG. 6 is an illustrative, cross-sectional view of a light source module in accordance with a second embodiment of the present disclosure.

Referring to FIG. 6, a light source module 1*a* in accordance with a second embodiment is shown. Different from the light source module 1 shown in FIG. 1, an optical lens 5*a* of the light source module 1*a* only includes a light diffusion body 2 and a light transmissive layer 3 formed on a top of the light diffusion body 2. The receiving cavity 231 is completely filled by the light transmissive layer 3. A top of the light transmissive layer 3 is coplanar with the central portion of the second optical surface 23. In the present embodiment, the central portion of the second optical surface 23 is a planar face. In other words, the top of the light transmissive layer 3 and the central portion of the second optical surface 23 cooperatively form a planar surface at the top of the optical lens 5*a*.

Figure 7:
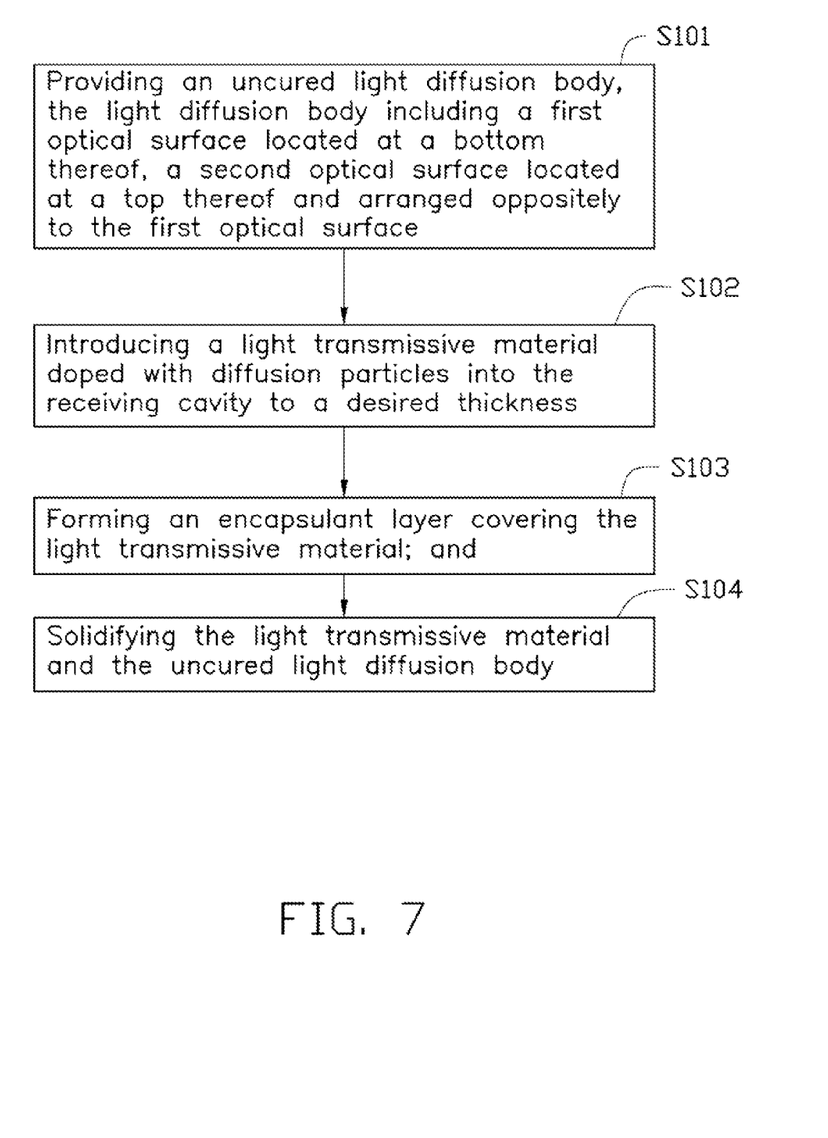
FIG. 7 is a flow chart illustrating a manufacturing process of an optical lens of the light source module of FIG. 1.

Referring to FIG. 7, a flowchart is presented in accordance with a first example embodiment which is being thus illustrated. The first example method is provided by way of example, as there are a variety of ways to carry out the method. The first example method described below can be carried out using the configurations illustrated in FIGS. 1-3, for example, and various elements of these figures are referenced in explaining example method. Each block shown in FIG. 7 represents one or more processes, methods or subroutines, carried out in the example method. Additionally, the illustrated order of blocks is by the first example only and the order of the blocks can change according to the present disclosure. The first example method can begin at block S101.

At block S101, an uncured light diffusion body is provided. The uncured light diffusion body includes a first optical surface located at a bottom thereof, and a second optical surface located at a top thereof and arranged oppositely to the first optical surface. The uncured light diffusion body is formed by a hot-pressing technology.

The light diffusion body defines a receiving cavity recessed from a central portion of the second optical surface toward the first optical surface. The first optical surface is recessed inwardly toward the second optical surface to form a recess for accommodating the LED light source.

At block S102, a light transmissive material doped with diffusion particles is introduced into the receiving cavity. The light transmissive material is introduced into the receiving cavity by a spin coating method.

The spin coating method includes the following processes: injecting the light transmissive material into the receiving cavity; and rotating the light diffusion body with respect to an axis in a center thereof so as to uniformly spread the light transmissive material onto a top side of the light diffusion body. In details, the uncured light diffusion body can be disposed on a plate fixed to a rotating shift driven by a motor, and then the light transmissive material is injected into the receiving cavity during rotation of the light diffusion body.

The light transmissive material is in a liquid state doped with the diffusion particles in a powder state. The fluid light transmissive material is then injected into the receiving cavity by a dispenser to have a thickness smaller than a depth of the receiving cavity.

At block S103, an encapsulant layer is formed on a top of the light transmissive material and covers the light transmissive material. The encapsulant layer can be introduced into the receiving cavity in a same manner as the light transmissive material.

At block S104, the encapsulant layer, the light transmissive material, and the light diffusion body are solidified. The light transmissive material and the uncured light diffusion body are exposed to an ultraviolet irradiation to solidify.

Figure 8:
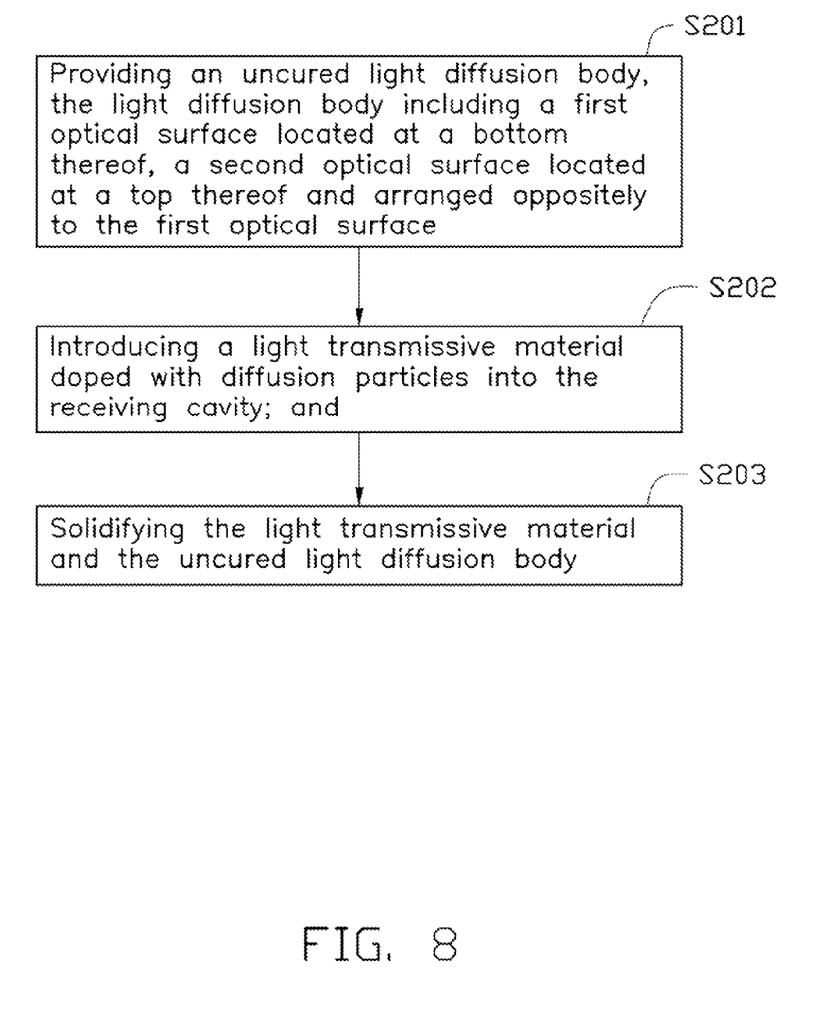
FIG. 8 is a flow chart illustrating a manufacturing process of an optical lens of the light source module of FIG. 6.

Referring to FIG. 8, a flowchart is presented in accordance with a second example embodiment which is being thus illustrated. The second example method is provided by way of example, as there are a variety of ways to carry out the method. The second example method described below can be carried out using the configurations illustrated in FIG. 6, for example, and various elements of these figures are referenced in explaining example method. Each block shown in FIG. 8 represents one or more processes, methods or subroutines, carried out in the example method. Additionally, the illustrated order of blocks is by the second example only and the order of the blocks can change according to the present disclosure. The second example method can begin at block S201.

At block S201, an uncured light diffusion body is provided. The uncured light diffusion body includes first optical surface located at a bottom thereof, a second optical surface located at a top thereof and arranged oppositely to the first optical surface. The uncured light diffusion body is formed by a hot-pressing technology.

At block S202, a light transmissive material doped with diffusion particles is introduced into the receiving cavity. The light transmissive material is introduced into the receiving cavity by a spin coating method. The receiving cavity is completely filled by the light transmissive material.

At block S203, the light transmissive material and the light diffusion body are solidified. The light transmissive material and the uncured light diffusion body are exposed to an ultraviolet irradiation to solidify.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments.

What is claimed is:

1. A method for manufacturing an optical lens configured to diffuse light emitted from a light emitting diode (LED) light source, the method comprising:
providing a uncured light diffusion body, the light diffusion body comprising a first optical surface located at a bottom thereof, and a second optical surface located at a top thereof and arranged oppositely to the first optical surface, the light diffusion body defining a receiving cavity recessed from a central portion of the second optical surface toward the first optical surface;
introducing a light transmissive material doped with diffusion particles into the receiving cavity to a desired thickness; and
solidifying the light transmissive material and the light diffusion body.

2. The method of claim 1, wherein the light transmissive material has a lower refractive index than that of the light diffusion body.

3. The method of claim 1, wherein the light transmissive material is introduced into the receiving cavity by a spin coating method.

4. The method of claim 3, wherein the spin coating method comprises injecting the light transmissive material into the receiving cavity and rotating the light diffusion body with respect to an axis in a center thereof so as to uniformly spread the light transmissive material onto the light diffusion body.

5. The method of claim 1, wherein the uncured light diffusion body is formed by a hot-pressing technology.

6. The method of claim 1, wherein the light diffusion body comprises a third optical surface located at a lateral side thereof, and the third optical surface extends between the first optical surface and the second optical surface.

7. The method of claim 6, wherein the first optical surface is recessed inwardly toward the second optical surface to define a recess for accommodating the LED light source.

8. The method of claim 7, wherein the light diffusion body further comprises an annular bottom surface interconnecting a bottom side of the third optical surface and a bottom side of the first optical surface.

9. The method of claim 1, wherein the receiving cavity is completely filled by the light transmissive material before solidifying the light transmissive material and the light diffusion body, and then a top of the light transmissive material is coplanar with the central portion of the second optical surface.

10. The method of claim 1, wherein the light transmissive material is filled into the receiving cavity to a first thickness smaller than a depth of the receiving cavity.

11. The method of claim 10, further comprising a process of forming an encapsulant layer covering the light transmissive material.

12. The method of claim 11, wherein the encapsulant layer has a refractive index lower than that of the light diffusion body and the light transmissive material.

13. The method of claim 11, wherein a thickness of the encapsulant layer is less than one half of the thickness of the light transmissive material.

14. The method of claim 13, wherein the diffusion particles are made of a material selected from a group consisting of sulfides, silicates, nitrides, nitrogen oxides, hydroxid, garnets and mixtures thereof, the diffusion particle being capable of converting a wavelength of light emitted from the LED light source.

15. The method of claim 1, wherein the receiving cavity has a funnel shaped configuration with an inner diameter thereof gradually decreasing toward the firs optical surface.

16. The method of claim 1, wherein the light transmissive material and the uncured light diffusion body are exposed to an ultraviolet irradiation to solidify.

17. An optical lens configured to diffuse light emitted from a light emitting diode (LED) light source, the optical lens comprising:
a light diffusion body comprising a first optical surface located at a bottom thereof, and a second optical surface located at a top thereof and arranged oppositely to the first optical surface, the light diffusion body defining a receiving cavity recessed from a central portion of the second optical surface toward the first optical surface; and
a light transmissive layer doped with diffusion particles received in the receiving cavity.

18. The optical lens of claim 17, wherein a refractive index of the light transmissive layer is smaller than that of the light diffusion body.

19. A light source module, comprising:
a light emitting diode (LED) light source; and
an optical lens configured to diffuse light emitted from the LED light source;
the optical lens comprising:
a light diffusion body comprising a first optical surface located at a bottom thereof, and a second optical surface located at a top thereof and arranged oppositely to the first optical surface, the light diffusion body defining a receiving cavity recessed from a central portion of the second optical surface toward the first optical surface; and
a light transmissive layer doped with diffusion particles received in the receiving cavity;
wherein the light emitted from the LED light source enters into the light diffusion body through the first optical surface, most of the entering light is refracted out of the first diffusion body through the second optical surface, and a part of the exiting light from the light diffusion body that enters into the light transmissive layer is scattered by the diffusion particles distributed in the light transmissive layer.

20. The light source module of claim 19, wherein the first optical surface is recessed inwardly toward the second optical surface to define a recess for accommodating the LED light source.

* * * * *